United States Patent [19]

Matsuoka et al.

[11] Patent Number: 5,119,356
[45] Date of Patent: Jun. 2, 1992

[54] INFORMATION RECORDING AND REPRODUCING APPARATUS INCLUDING DETECTION OF WHETHER AN INFORMATION RECORDING MEDIUM HAS BEEN NORMALLY LOADED INTO THE APPARATUS

[75] Inventors: Kazuhiko Matsuoka; Masayuki Usui, both of Yokohama, Japan

[73] Assignee: Canon Kabushiki Kaisha, Tokyo, Japan

[21] Appl. No.: 742,519

[22] Filed: Aug. 6, 1991

Related U.S. Application Data

[63] Continuation of Ser. No. 653,486, Feb. 12, 1991, abandoned, which is a continuation of Ser. No. 230,043, Aug. 9, 1988, abandoned.

[30] Foreign Application Priority Data

Aug. 11, 1987 [JP] Japan .................. 62-199163

[51] Int. Cl.⁵ .................................................. G11B 7/00
[52] U.S. Cl. .................................... 369/58; 235/454
[58] Field of Search ......................... 369/53–58, 369/100, 233, 199, 200, 195, 50; 235/454, 487

[56] References Cited

U.S. PATENT DOCUMENTS

| 4,497,049 | 1/1985 | Costemore D'Arc | 369/50 |
|---|---|---|---|
| 4,680,744 | 7/1987 | Kanamaru | 369/58 X |
| 4,723,234 | 2/1988 | Katsuyama et al. | 369/54 X |
| 4,751,394 | 6/1988 | Matsuoka et al. | 250/233 R X |
| 4,809,252 | 2/1989 | Ikedo et al. | 369/36 X |
| 4,893,293 | 1/1990 | Endo et al. | 369/33 X |

FOREIGN PATENT DOCUMENTS

| 55-38663 | 3/1980 | Japan | 369/54 |
|---|---|---|---|
| 57-152570 | 9/1982 | Japan | 369/54 |
| 58-211337 | 12/1983 | Japan | 369/54 |
| 58-212631 | 12/1983 | Japan | 369/58 |
| 59-72660 | 4/1984 | Japan | 369/58 |
| 59-119570 | 7/1984 | Japan | 369/58 |
| 59-177701 | 10/1984 | Japan | 369/54 |
| 62-146463 | 6/1987 | Japan | 369/100 |

OTHER PUBLICATIONS

Cover sheet of U.S. Pat. No. 4,672,759; Pocheity et al.

*Primary Examiner*—Robert L. Richardson
*Attorney, Agent, or Firm*—Fitzpatrick, Cella, Harper & Scinto

[57] ABSTRACT

An information recording and reproducing apparatus includes a head unit for recording information on and reproducing information from an information recording medium having a plurality of linear tracks arranged in parallel, a device for moving the head unit relative to the recording medium, and a detector for detecting whether the record medium has been loaded into the apparatus in a normal state. The detector includes a photo-detection unit having a light projector for projecting a light beam to the recording medium and a photo-detector for detecting a light beam from the recording medium. The photo-detection unit is arranged such that when the recording medium is inserted in the normal state, the light beam from the light projector illuminates a track of the recording medium and the photo-detector detects high-order diffracted light from the illuminated track.

11 Claims, 5 Drawing Sheets

INFORMATION RECORDING AND REPRODUCING APPARATUS INCLUDING DETECTION OF WHETHER AN INFORMATION RECORDING MEDIUM HAS BEEN NORMALLY LOADED INTO THE APPARATUS

This application is a continuation of prior application Ser. No. 07/653,486 filed Feb. 12, 1991, which application is a continuation of prior application Ser. No. 07/230,043 filed Aug. 9, 1988, both now abandoned.

BACKGROUND OF THE INVENTION

1. Field of the Invention

The present invention relates to an optical information recording and reproducing apparatus, and more particularly to an optical information recording and reproducing apparatus capable of checking a loading state of an optical information recording medium. The present invention may be preferably applied to an optical information recording/reproducing apparatus which uses a card-like optical information recording medium.

Media for recording information for and reproducing such recorded information by light beams include disks, cards and tapes. Such media include ones which permit recording and reproducing of information and ones which permit only reproducing of information.

Information is recorded on such a recording medium by scanning information tracks with a light beam modulated in accordance with record information and focused to a fine spot so that the information is recorded as an optically detectable information bit train.

Information is reproduced from the recording medium by scanning the information bit train on the information tracks with a light beam spot of a predetermined power which is small enough to inhibit recording on the recording medium, and by detecting reflected light or transmitted light from the medium.

An optical head is used to irradiate a light beam spot to the recording medium and to detect the reflected light or transmitted light from the medium. The optical head is movable relative to the recording medium along and across the information tracks so that the information tracks are scanned by the light beam.

Of the optical information recording media, the card-like optical information recording medium (hereinafter referred to as an optical card) is compact, light in weight, easy to carry, and of large capacity. Thus, a large demand is expected for such a medium.

FIG. 1(a) shows a schematic plan view of an optical card and FIG. 1(b) shows a sectional view taken along line B—B thereof.

A format of an optical card is disclosed in detail in U.S. patent application Ser. No. 07/033,189, filed Apr. 3, 1987, now abandoned in favor of copending application Ser. No. 07/479,205 and assigned to the assignee of the present invention.

In FIGS. 1(a) and 1(b), numeral 1 denotes an optical card. A surface of the optical card 1 includes an information record area 31 and a blank area 32, other than the record area. The blank area 32 may include an appropriate logo 33 so that a user can visually identify the type or application of the optical card. In the information record area 31, a plurality of tracking tracks 34, preformatted for auto-tracking are arranged in parallel. Areas between adjacent tracking tracks are information tracks 35 on which information is recorded.

As seen from FIG. 1(b), the optical card 1 includes a plurality of layers. Numeral 36 denotes a transparent protective layer, and numeral 37 denotes a record layer. The record layer may be made of silver halide, dye or calcogen. A boundary between the transparent protective layer 36 and the record layer 37 has steps by which the tracking tracks 34 and the information tracks 35 are formed. Numeral 39 denotes a substrate which is bonded to the record layer 3 by a bonding layer 38.

FIG. 2 shows a block diagram of an apparatus for recording information on the optical card and/or for reproducing the information recorded on the optical card. Such a block diagram is disclosed in U.S. Pat. No. 4,751,394.

In FIG. 2, numeral 1 denotes an optical card which is securely mounted on a shuttle 5 in a position perpendicular to a direction indicated by double-head arrow B. The optical card 1 is loaded such that the tracking tracks and the information tracks are oriented in a direction indicated by double-head arrow A.

Numerals 22 and 23 denote pulleys. A belt 24 spans between those pulleys, and the shuttle 5 is fixed to the belt. The pulley 22 is mounted on a shaft of a drive motor 26. The belt 24 is driven by forward or backward rotation of the motor so that the shuttle 5 is reciprocally moved in the direction A.

Numeral 3 denotes an optical head which contains a semiconductor laser 8 as a light source, a collimater lens 9, a polarization beam splitter 10, a quarter wavelength plate 30, an objective lens 11 and a photo-sensor 12. The optical head 3 is intermittently driven by a stepping motor 21 in a direction C (normal to the plane of the drawing).

A light beam from the laser 8 passes through the collimater lens 9, the polarization beam splitter 10 and the quarter wavelength plate 30, and is focused by the objective lens 11 into a light beam 4, which forms a fine spot on the optical card 1. Light of the light beam reflected by the optical card 1 passes through the objective lens 11 and the quarter wavelength plate 30, and is reflected by the polarization beam splitter 10 to the photo-sensor 12.

An output of the photo-sensor 12 is applied to a pre-amplifier 13 which produces a focusing error signal and a tracking error signal, which are supplied to auto-focusing servo means 14 and auto-tracking servo means 15, respectively, which in turn issue commands for auto-focusing and auto-tracking to drive mechanisms (not shown) to move the objective lens 11 in the directions of B and C, respectively.

On the other hand, the reproduced information signal from the preamplifier 13 is applied to a decoder 16, an output of which is supplied to a computer 18 through an interface 17.

The computer 18 issues a command signal to the laser 8. The command signal reaches the laser 8 through the interface 17, an encoder 19 and a laser driver 20. The computer 18 also issues a command signal for the stepping motor 21. The command signal reaches the stepping motor 21 through the interface 17. The computer 18 further issues a command signal for the drive motor 26. The command signal reaches the motor 26 through the motor servo means 27.

In the above recording/reproducing apparatus, information is recorded on the optical card 1 and/or reproduced from the optical card 1 by intermittently moving the optical head 3 in the direction C while the optical card 1 is reciprocally moved in the direction A at a predetermined stroke while being irradiated by the semiconductor laser 8.

For recording and/or reproducing information, the optical card 1 is manually inserted in the direction A from a card insert port and mounted on the shuttle 5 which conveys the optical card to the recording or reproducing position.

There are several orientations for the optical cards when inserted from the card insert port. Namely, the cards may be inserted in a normal orientation, in an inverted orientation or in a reverse (up-side down) orientation.

When the optical card is inserted in the inverted or reverse orientation, the surface of the transparent protective layer 36 of the optical card may be damaged. If the transparent protective layer is damaged in the information record area 31, the focusing state of the light beam 4 is disturbed and normal recording/reproducing of information may not be attained.

Accordingly, it is necessary to determine whether the optical card has been inserted in the normal orientation.

In the prior art information recording/reproducing apparatus, in order to determine whether the optical card has been loaded at the predetermined position on the shuttle in the normal orientation, an optical card having a small hole at one corner thereof is used. The optical card is illuminated from one side of the optical card and a photo-detector arranged on the other side of the optical card detects a light input. In this method, however, the optical card must be a special one having the small hole formed therein.

U.S. Pat. No. 4,751,394 discloses an optical information recording/reproducing apparatus which permits determination of a loading status of an optical card without using a special form of optical card. In the disclosed apparatus, an illumination light is irradiated from the optical head to the optical card, light reflected from the optical card is detected by a photo-detector, and the load status of the optical card is determined in accordance with the detected light intensity by utilizing a difference between reflection factors at different areas on the optical card. In the disclosed apparatus, however, the reliability of such a determination is low when an optical card having a small difference in reflection factors of the information record area 31 and the blank area 32 of FIG. 1(a) is used, or when an optical card having a small difference in reflection factors between the front side and the back side is used. In the disclosed apparatus, the optical card must be manufactured by using different materials for the front side and back side.

However, optical card of a type which is not anticipated to be used may be loaded into the recording/reproducing apparatus. Accordingly, it is desirable to determine the orientation of loading as well as whether the loaded optical card is a predicted one or not.

U.S. patent application Ser. No. 06/838,443, now abandoned in favor of copending application Ser. No. 07/374,626 and assigned to the assignee of the present invention discloses a method for detecting an information recording medium having a different characteristic by detecting a level of a reflected or transmitted light of an information detecting light beam from an information recording medium. In this method, however, each of the information recording media used must have a different reflection factor or different transmission characteristic.

SUMMARY OF THE INVENTION

It is an object of the present invention to provide an optical information recording/reproducing apparatus which can easily and exactly determine the load status of an information record medium loaded into a recording and reproducing apparatus, including determining orientation of the loading and the type of the information recording medium loaded therein.

In order to achieve the above object, the present invention provides an optical information recording and reproducing apparatus for optically recording information on an information recording medium having a plurality of linear tracks arranged in parallel thereon and/or optically reproducing the information recorded on the information record medium, which apparatus comprises optical detection means including an illumination unit for illuminating a track of the information recording medium and a photo-detection unit for detecting a high-order diffracted light from the track of the recording medium, for detecting the loading status of the information recording medium.

DESCRIPTION OF THE PREFERRED EMBODIMENTS

Figure 3:
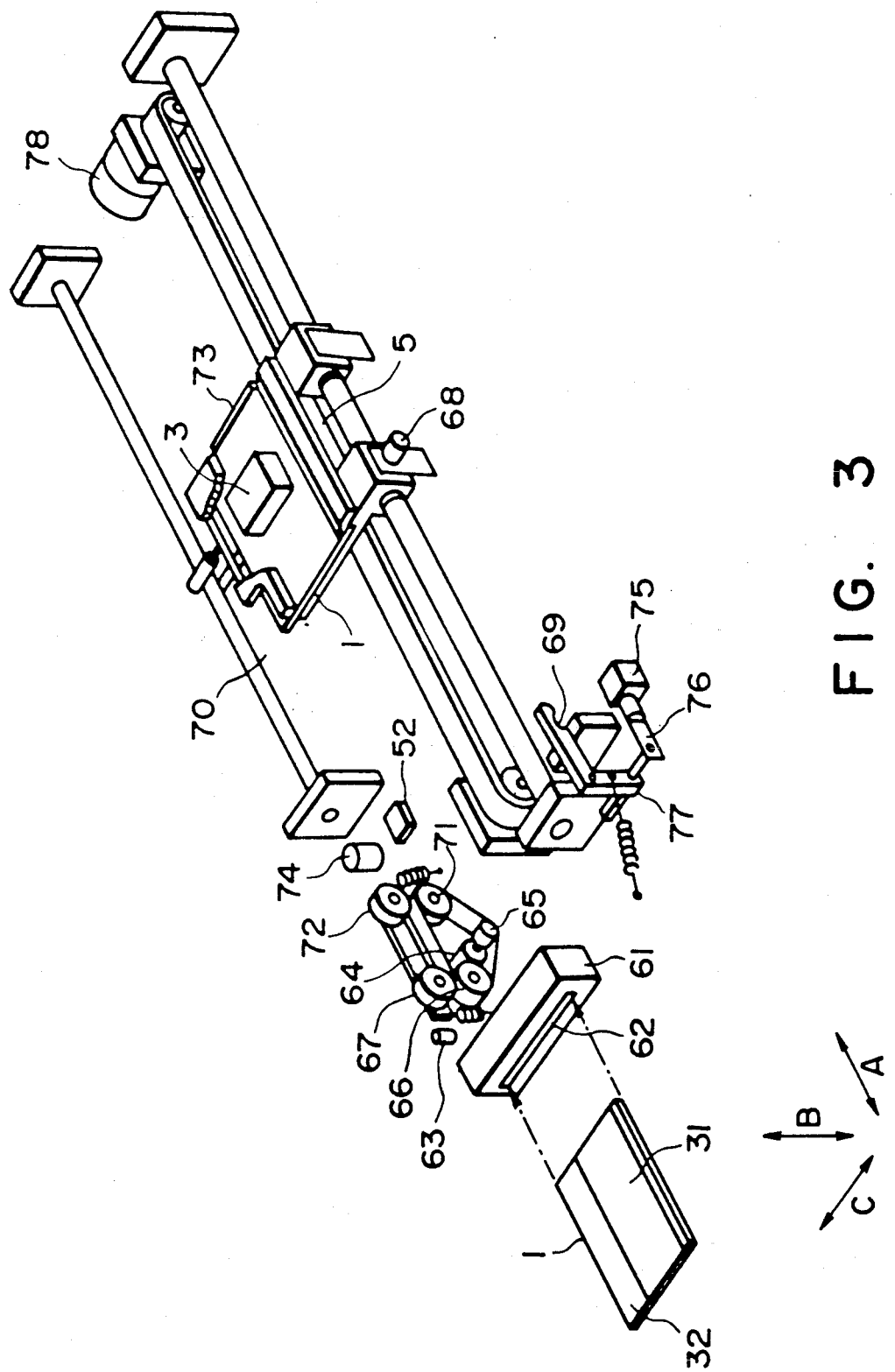
FIG. 3 shows a perspective view of a portion of one embodiment of an optical information recording and reproducing apparatus of the present invention.

FIG. 3 shows a perspective view of a portion of one embodiment of the optical information recording and reproducing apparatus of the present invention. It particularly shows error detection means and an optical card transport mechanism. In the present embodiment, an optical card is used as an optical information recording medium.

When the optical card 1 is inserted in an opening 62 of a card insert port 61, a sensor 63 senses the entry of the optical card and a motor 64 rotates a pulley 65. As the optical card 1 is further pushed in, a leading edge of the optical card is pinched between rollers 66 and 67 and guided by guide means (not shown) in the direction indicated by double-head arrow A. A shuttle 5 is now at a position to cause a projection 68 thereof to engage with a recess 69, and rollers 71 and 72 mesh with a notch 70 of the shuttle 5. As the motor 64 further rotates, the optical card 1 is pushed by the rollers 71 and 72 and inserted into the shuttle 5 until it abuts against a stopper 73. The sensor 63 detects the entry of the optical card and the motor 64 is stopped after a predetermined time period.

Numeral 74 denotes a light projector comprising a light source and a condensor lens, and numeral 52 denotes a photo-sensor. The error detection means constitutes the light projector 74 and the photo-sensor 52.

Figure 4:
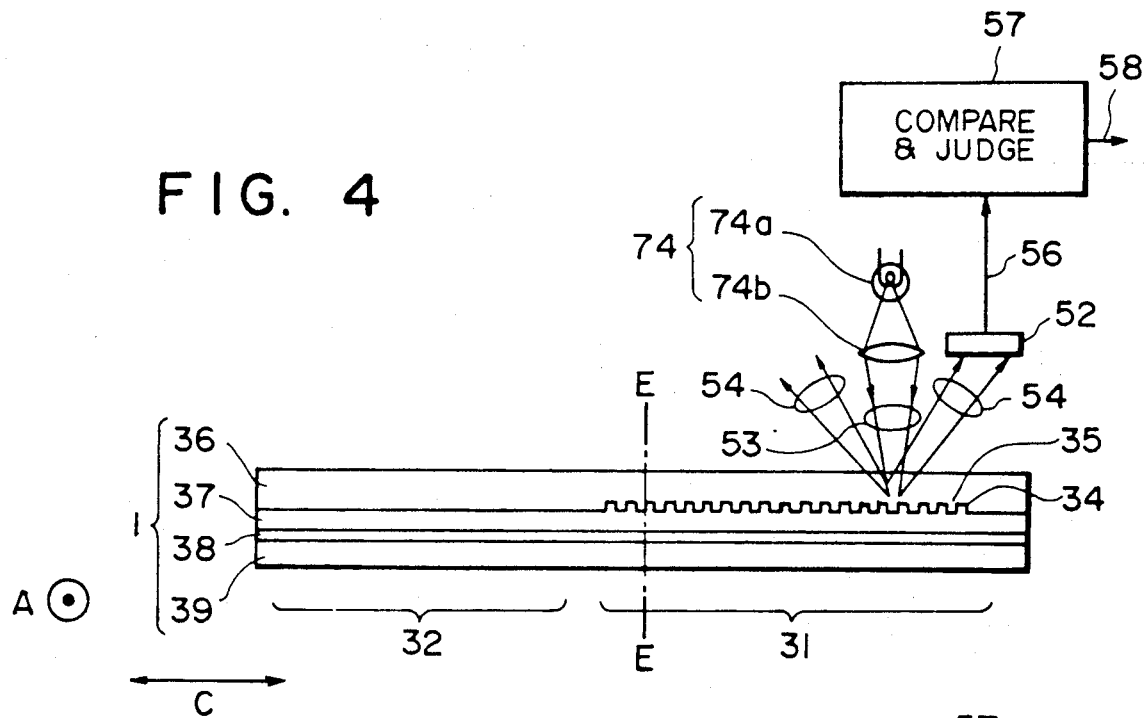
FIGS. 4, 5, 6, 7 and 8 show sectional views for explaining functions of error detection means used in the present invention.

FIG. 4 shows a schematic sectional view for explaining a function of the error detection means.

Figure 1A:
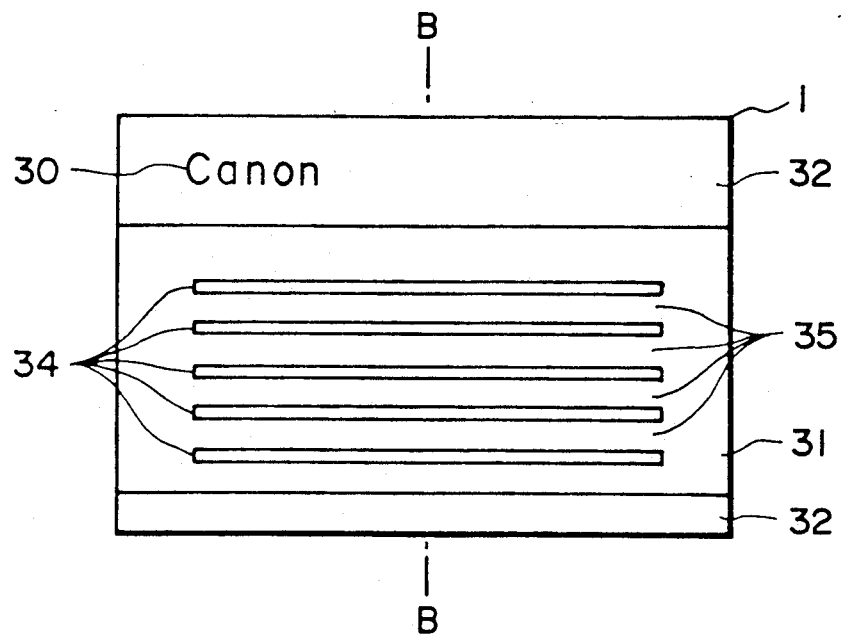
FIG. 1(a) shows a schematic plan view of an optical card and FIG. 1(b) shows a sectional view taken along line B—B thereof.
Figure 1B:
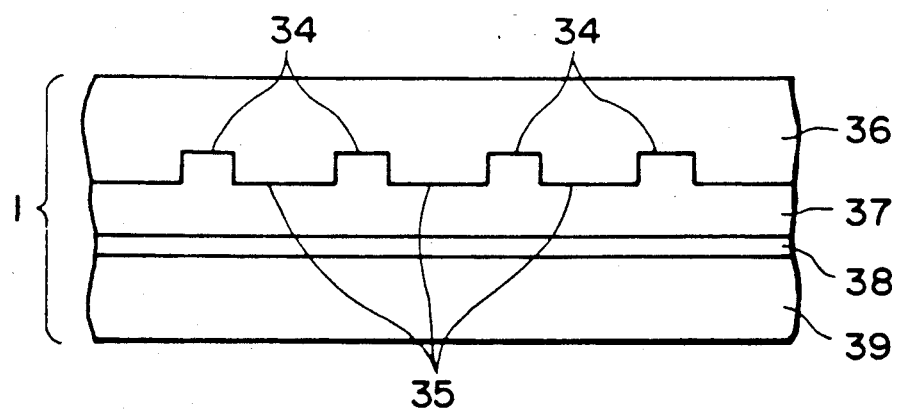
Figure 2:
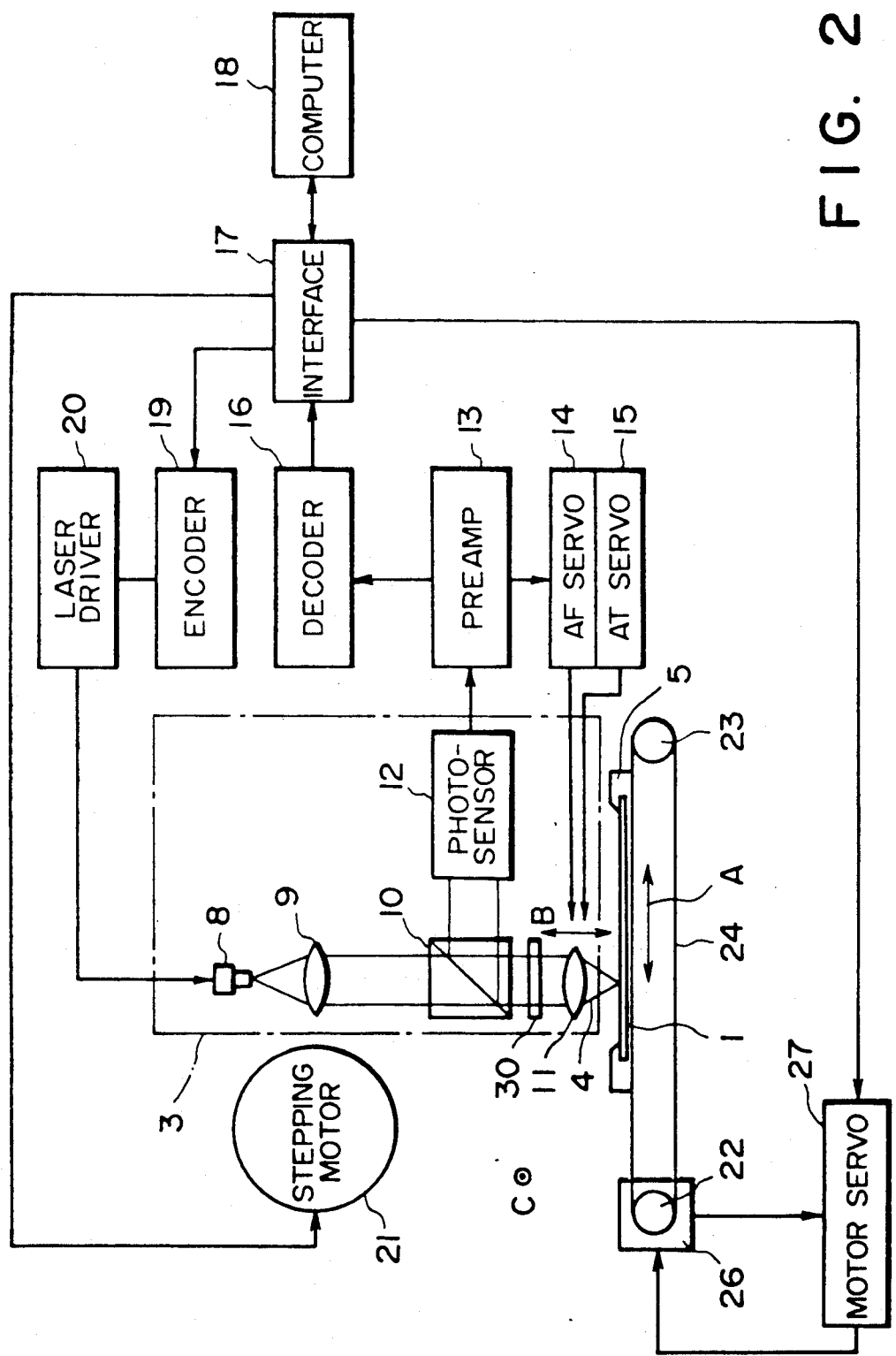
FIG. 2 shows a structure of an optical card information recording and reproducing apparatus.

In FIG. 4, the optical card 1 comprises a transparent protective layer 36, a record layer 37, a bonding layer 38, and a substrate 39, as shown in FIG. 1, and has an information recording area 31 including tracking tracks 34 and information tracks 35 and a blank area 32. The information recording area 31 is offset with respect to a center E—E of the optical card 1.

In FIG. 4, the optical card 1 has been loaded in a normal orientation. The light projector 74 and the photo-sensor 52 are arranged above the information recording area 31 of the normally loaded optical card 1.

A light beam 53 emitted from a light source (for example, an LED) 74a of the light projector 74 is focused by a condenser lens 74b to form a spot (having a diameter of several mm, for example) on the information recording area 31. The information recording area 31 includes the tracking tracks 34 and the information tracks 35 regularly arranged with a width of several μm and a pitch of several μm, and thus, it functions as a reflection type diffraction grating. Accordingly, high-order diffracted light beams (primary diffracted light, secondary diffracted light, etc.) 54 are reflected in a direction determined by the track pitch, a step between the tracks and a wavelength of the illumination light beam. A 0-order diffracted light is normally reflected and does not reach the photo-sensor 52. The photo-sensor 52 is arranged at a position which the high-order diffracted light beam 54 reaches for a specific type of optical card 1 in order to determine whether the area illuminated by the light projector 74 is the record area 31 or not. A detection output 56 of the photo-sensor 52 is compared with a reference value by a comparator 57. When the detection output 56 is higher than the reference value, the comparator 57 produces a normal load signal 58. The comparator 57 forms a part of the error detection means.

Figure 5:
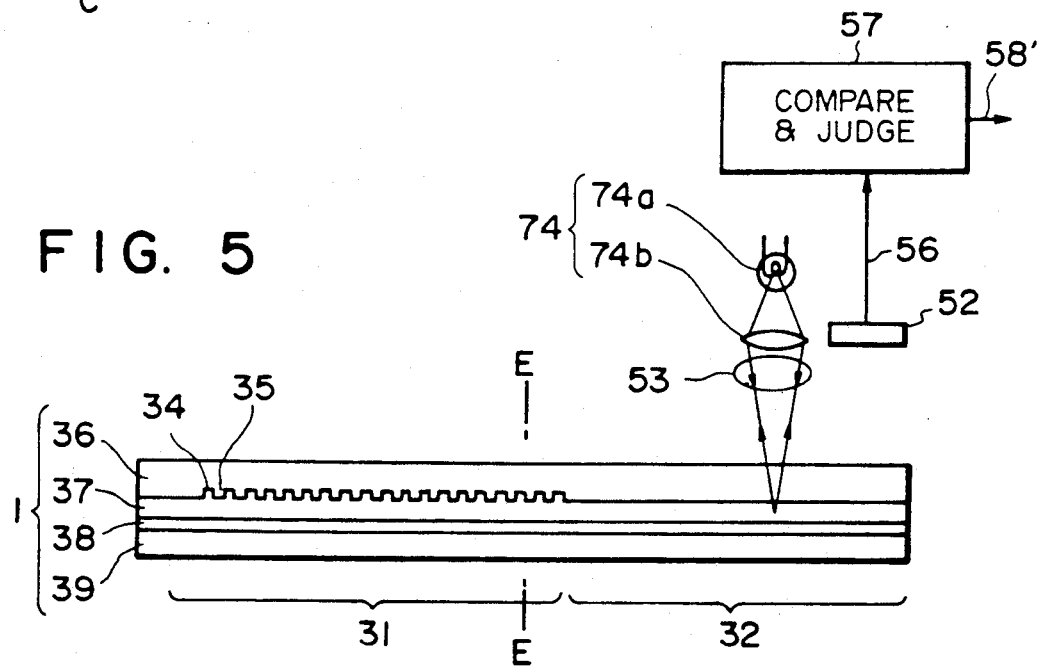

In FIG. 5, the optical card 1 has been loaded in an inverted orientation. Since the area illuminated by the light projector 74 is now the blank area 32, the illumination light 53 is reflected normally, and no light reaches the photo-sensor 52. Accordingly, the detection output 56 of the photo-sensor 52 is substantially zero and the comparator 57 produces an abnormal load signal 58'.

Figure 6:
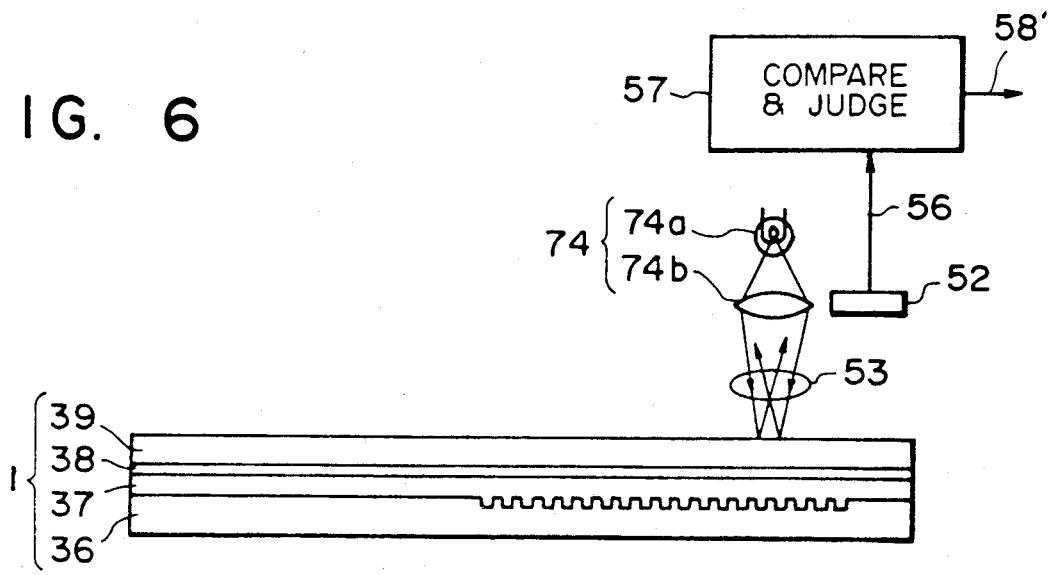

In FIG. 6, the optical card 1 has been loaded in a reverse (front side down) orientation. In this case, since the area illuminated by the light projector 74 is the substrate 39, the illumination light 53 is reflected normally, and no light reaches the photo-sensor 52. Accordingly, the detection output 56 of the photo-sensor 52 is substantially zero and the comparator 57 produces the abnormal load signal 58'.

Accordingly, in accordance with the present embodiment, the load orientation of the optical card can be readily and exactly determined in accordance with the output of the comparator 57, before the card 1 is transported to the information recording and reproducing portion, for example, at a predetermined time after the detection of the insertion of the optical card.

In the present embodiment, since the presence or absence of the high-order diffracted light from the track is detected by the photo-sensor 52, a sufficient difference in the light intensity is attained between the normal load orientation and the abnormal load orientation. Further, since the comparator 57 compares the detection output with the reference value and binarizes the result, an exact and effective determination is made without any ambiguity. In the present embodiment, the loading orientation can be determined even for an optical card having a small difference in reflection factors between the information record area 31 and the blank area 32. Thus, a design restriction for the optical card is relieved.

When it is determined that the optical card 1 has been loaded in the normal orientation, a solenoid 75 in FIG. 3 pulls a lever 76 to disengage a recess 69 of a lever 77 from a projection 68 of the shuttle 5. A motor 78 is rotated a predetermined time later to transport the shuttle 5 to the recording and reproducing position where the information is recorded or reproduced by the optical head 3.

On the other hand, when it is determined that the optical card 1 has been inserted in an abnormal orientation, the motor 64 is rotated in the opposite direction to that in the insertion mode to eject the optical card from the insert port 61. Display means may be used to display the abnormal orientation so that a user can recognize it.

In the present embodiment, even if the optical card is inserted in the normal orientation as shown in FIG. 4, the intensity of the diffracted light 54 may be low because of aging of the record layer 37 or the transparent protective layer 36 of the optical card 1. In this case, the comparator 57 does not produce the normal load signal. Thus, when the characteristic of the optical card 1 has deteriorated, the orientation status is determined to be an error, even if the load orientation is normal.

As to the position of the photo-detector which serves as the information recording medium status detection means, the photo-detector may be arranged near a card abutment (stopper) of a mount on which the card is mounted. When the card alone is transported, the photo-detector may be arranged at such a position that a light beam from the light projector of the photo-detector irradiates a track on the card when the card is at a desired position relative to the recording and reproducing head in a recording and reproducing mode.

Figure 7:
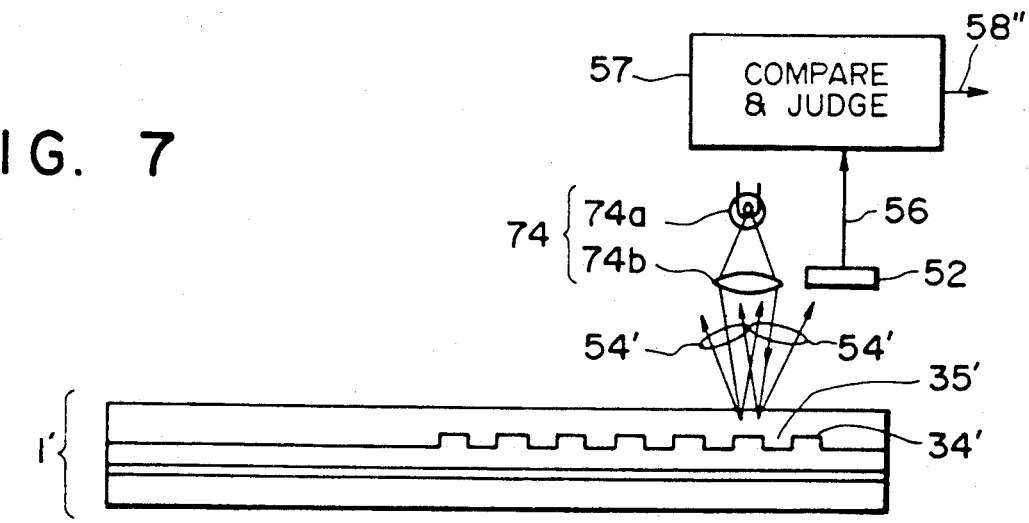

In FIG. 7, an optical card 1' having a track form such as an arrangement pitch of the tracking tracks 34' and information tracks 35 different from that of the normal optical card 1 has been loaded in a normal orientation. In such a case, the direction of reflection and the intensity of the high-order diffracted light 54' from the track illuminated by the light projector 74 are different from those of the normal optical card, and the light intensity to the photo-sensor 52 is lower than that of the normal optical card. Accordingly, the detection output 56 of the photo-sensor 52 is lower than the reference value of the comparator 57, which produces an abnormal load signal 58".

When the step of the tracks is different from that of the normal optical card, the intensity of the reflected light is different although the direction of reflection of the high-order diffracted light does not change. When the pitch is different from that of the normal card, the direction of the reflection changes although the intensity of the reflected light of the high-order diffracted light does not change. In any case, the light intensity to the photo-sensor changes.

In the present embodiment, by setting a plurality of reference values of the comparator 57 stepwise and by comparing the detection output 56 with those reference values, the detection output 56 may be determined to be higher than some of the reference values and lower than other reference values. In this manner, it is possible to determine that the optical card is loaded in the normal orientation, but that the loaded optical card is not a proper one.

When the optical card is determined to be an improper one, the optical card may be ejected from the apparatus. Further, the detection of an improper optical card may be displayed to inform a user of such.

Figure 8:
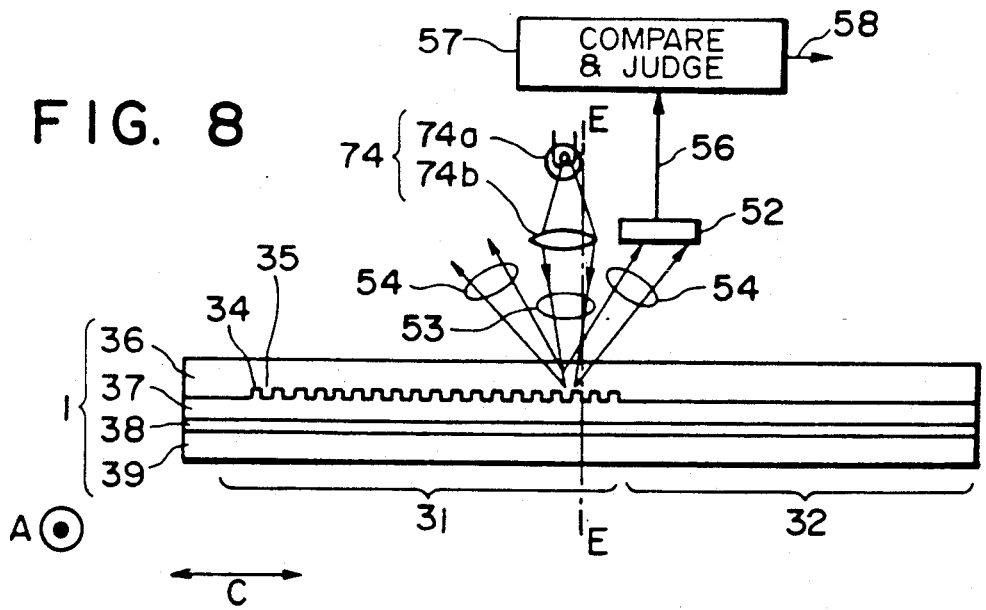

In the above embodiment, the photo-detector comprising the light projector and the photo-sensor is offset relative to the center of the optical card and is closer to one side of the optical card in a direction orthogonal to the transport direction of the optical card. Alternatively, it may be arranged near the center of the optical card as shown in FIG. 8. In such a case, the reverse (front side down) orientation of the optical card can be detected.

In the above embodiment, the light projector 74 comprises the light source 74a and the condenser lens 74b. Alternatively, the light projector may be an integrated light source and condenser lens. Further, the condenser lens may be omitted. In this case, since the reflected light scatters, the photo-detector is preferably located at a position where the normally reflected light and the high-order diffracted light are sufficiently spatially separated.

While the card-like information recording medium has been explained in the embodiment an information recording medium of any shape may be used, as long it has a plurality of tracking tracks arranged in parallel.

In accordance with the present invention, the loading orientation of the recording medium and the type of the loaded recording medium are determined depending on whether the high-order diffracted light from the information record area has been detected or not. Accordingly, the determination is exact. Further, since there is no restriction on the reflection factor distribution of the recording medium, various types of recording media may be used.

What is claimed is:

1. An apparatus for performing at least one of information recording and reproducing using an information recording medium having a plurality of linear tracks arranged in parallel thereon, said apparatus comprising:
   a head unit capable of performing at least one of recording information on and reproducing information from the information recording medium;
   means for moving said head unit relative to the information recording medium for performing the at least one of recording information on and reproducing information from the recording medium by said head unit;
   detection means for detecting whether the information recording medium has been loaded into said apparatus in a normal state, said detection means comprising a photo-detection unit including a light projector for projecting a light beam onto the information recording medium, a photo-detector for detecting a light beam returned from the information recording medium and for producing an output, and means for comparing the output produced by said photo-detector with a reference value to determine a loading state when the photo-detector output exceeds the reference value,
   said photo-detection unit being arranged such that when the information recording medium has been inserted in the normal state, the light beam from the light projector illuminates a track of the recording medium and the photo-detector detects only a high-order diffracted light beam from among a plurality of diffracted light beams returned from the illuminated track and produces an output exceeding the reference value.

2. An apparatus according to claim 1, wherein said detection means further comprises a detection circuit for detecting whether the information recording medium has been normally loaded in accordance with the output from said photo-detector.

3. An apparatus according to claim 2, further comprising means for ejecting the information recording medium out of the apparatus in response to an output of said detection circuit.

4. An apparatus according to claim 2, wherein said detection circuit comprises means for producing an error signal, and further comprising display means for displaying improper loading of the recording medium when said detection circuit produces an error signal.

5. An apparatus according to claim 1, wherein said photo-detection unit is arranged such that when the information recording medium has been inserted in an abnormal state, and even if the light beam from the light projector illuminates the information recording medium, the photo-detector does not detect reflected light from the recording medium.

6. An apparatus for detecting whether an information recording medium has been inserted into an apparatus in a normal state, said apparatus comprising:
   a light projection unit for irradiating the recording medium with a light beam; and
   a light receiving unit for receiving a light beam returned from the recording medium, said light receiving unit being positioned to receive only a high-order diffracted light beam from a track of the recording medium when the recording medium has been inserted into the apparatus in a normal state.

7. An apparatus according to claim 6, wherein said light receiving unit outputs a signal, and further comprising a detection circuit for receiving the signal from said light receiving unit, and for determining whether the recording medium has been inserted into the apparatus in a normal state.

8. An apparatus according to claim 7, wherein said detection circuit outputs a signal indicating improper insertion of the recording medium, and further comprising ejecting means for receiving the signal from said detection circuit, and for ejecting the recording medium out of the apparatus.

9. An apparatus according to claim 7, wherein said detection circuit outputs a signal indicating improper insertion of the recording medium, and further comprising display means for receiving the signal from said detection circuit, and for displaying an improper insertion of the information recording medium.

10. An apparatus according to claim 6, wherein said light receiving unit is arranged so as to not receive reflected light from the recording medium when the recording medium has been inserted into the apparatus in an improper state, even if the light beam from the light projection unit illuminates the information recording medium.

11. A method of detecting whether an information recording medium has been inserted into an apparatus in a normal state, said method comprising the steps of:
   irradiating the recording medium with a light beam;
   receiving by a light receiving unit a light beam returned from the recording medium, the light receiving unit being positioned to receive only a high-order diffracted light beam from a track of the recording medium when the recording medium has been inserted into the apparatus in a normal state;
   outputting a signal from the light receiving unit; and
   receiving the signal from the light receiving unit, and determining whether the information recording medium has been inserted into the apparatus in a normal state.

* * * * *

UNITED STATES PATENT AND TRADEMARK OFFICE
CERTIFICATE OF CORRECTION

PATENT NO. : 5,119,356

DATED : June 2, 1992

INVENTOR(S) : Kazuhiko Matsuoka, et al.

Page 1 of 2

It is certified that error appears in the above-identified patent and that said Letters Patent is hereby corrected as shown below:

COLUMN 1

Line 17, "particularly" should read --particularly,--;
Line 24, "for and" should read --and for--; and
Line 55, "Ser. No. 07/033,189," should read --Ser. No. 07/033,789,--.

COLUMN 3

Line 35, "card" should read --card,--.

COLUMN 5

Line 23, "light" should read --light beam--; and
Line 66, "determined" should read --determined,--.

UNITED STATES PATENT AND TRADEMARK OFFICE
CERTIFICATE OF CORRECTION

PATENT NO. : 5,119,356
DATED : June 2, 1992
INVENTOR(S) : Kazuhiko Matsuoka, et al.

It is certified that error appears in the above-identified patent and that said Letters Patent is hereby corrected as shown below:

COLUMN 6

Line 51, "different" should read --different,--; and
    Line 59, "stepwise" should read --stepwise,--.

COLUMN 7

Line 21, "embodiment" should read --embodiment,--; and
    Line 55, "a loading state" should read --a normal loading state--.

Signed and Sealed this

Seventeenth Day of August, 1993

Attest:

BRUCE LEHMAN

*Attesting Officer*    *Commissioner of Patents and Trademarks*